Figure 1:
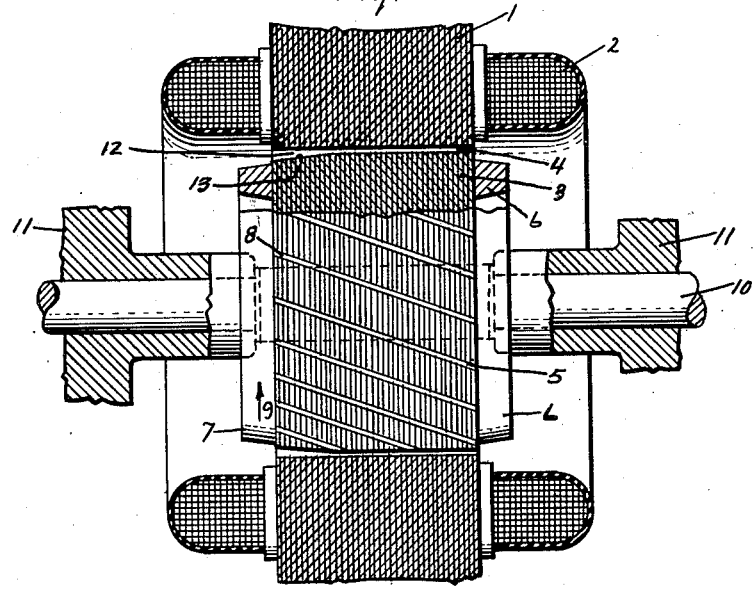

June 25, 1957  F. W. SUHR  2,797,347
INDUCTION TYPE ELECTRIC MOTOR
Filed March 27, 1956

Inventor:
Fred W. Suhr,
by Robert G. Lais
His Attorney.

United States Patent Office 2,797,347
Patented June 25, 1957

2,797,347

INDUCTION TYPE ELECTRIC MOTOR

Fred W. Suhr, Fort Wayne, Ind., assignor to General Electric Company, a corporation of New York Application March 27, 1956, Serial No. 574,231

5 Claims. (Cl. 310—166)

This invention relates to dynamoelectric machines, and more particularly to induction-type electric motors with a rotor member having a squirrel cage winding including skewed conductors, the rotor member being supported at each end by suitable bearing means.

Induction-type motors of the type which have a squirrel cage winding with skewed conductors in the rotor have found a wide field of application. The high number of motors involved makes it important to obtain the highest possible efficiency from them without substantial increase in expense, and to have the motor operate with a minimum of noise (many of the applications make the noise factor quite critical—for instance, when the motor is used to operate a fan). Investigations have shown that where the rotor squirrel cage winding is provided with skewed conductors, a standard arrangement for avoiding undesirable effects from harmonic components of line current, the net magnetomotive force, or M. M. F. (stator M. M. F. minus rotor M. M. F.) varies from one end of the rotor to the other, the net M. M. F. increasing substantially at the leading end of the skewed conductors. By "leading end" is meant that end of the conductors which is the most advanced in the direction of rotation of the motor when it is in operation. This increased net M. M. F. at one end of the rotor tends to cause a high flux density to exist at that end, and this in turn can cause the rotor and stator iron to become highly saturated. One effect of such saturation has been found to be an increase in the third and fifth harmonic components of line current, in exact opposition to the desired effect of skewing. Another effect of the high saturation at one end of the motor is a decrease in the efficiency of the motor caused by the increased excitation current which results in increased stator losses. It is most desirable to provide an economical construction which will eliminate these undesirable results and will increase efficiency and decrease noise.

It is, therefore, an object of this invention to provide an induction-type electric motor having the desirable features set forth above.

In one aspect thereof, the invention provides an electric induction-type motor which includes concentrically arranged relatively rotatable rotor and stator members which define an annular air gap. The rotor member has a squirrel cage winding with a plurality of skewed conductors. The stator member, in turn, is arranged to cause rotation of the rotor member in only a single predetermined direction. To overcome the conditions resulting from skewing, and provide a desirable decrease in noise and increase in efficiency, the air gap is arranged with a greater radial length for a predetermined axial length at the leading end of the conductors. This increased air gap has the effect of decreasing the flux density, and proper design can provide a decrease such as to make the flux density at the leading end of the conductors substantially the same as that over the remainder of the axial length of the motor.

The features of the invention which are believed to be novel are set forth with particularity in the appended claims. The invention, itself, together with further objects and advantages thereof, may best be understood by reference to the following description taken in connection with the accompanying drawing.

Figure 2:
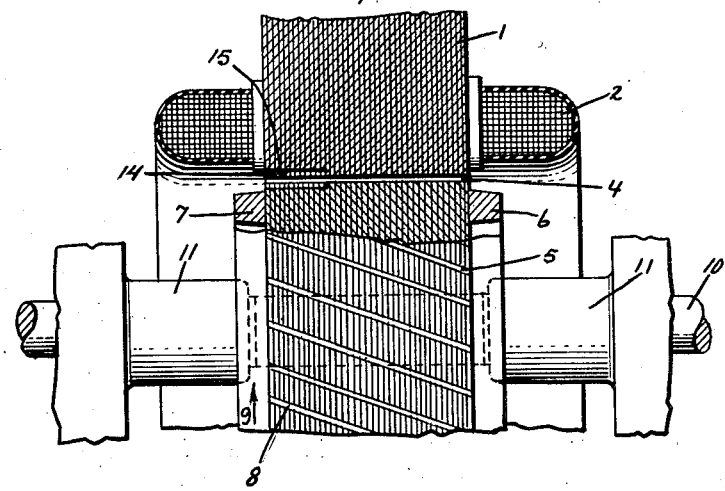

In the drawing, Figure 1 is a fragmentary side view, partly broken away and partly in cross section, of an induction-type electric motor incorporating the advantageous features of the invention; and Figure 2 is a fragmentary view, partly broken away and partly in cross section, of a second embodiment of the invention.

Referring now to Figure 1 of the drawing, there is shown an electric induction motor having a stator 1 made up in the usual manner of a stacked plurality of thin laminations of magnetic material. One or more windings, such as 2, are positioned in suitable openings (not shown) adjacent the bore of the stator. A rotor member 3, also made up of a stacked plurality of thin laminations of magnetic material, is arranged coaxially and concentrically within stator 1 so as to define an annular air gap 4 therebetween. The rotor has the standard squirrel cage type winding which includes a plurality of equispaced conductors 5 extending the axial length of the rotor, and a pair of end rings 6 and 7 at the respective ends of the rotor which join all the conductors 5 together electrically. It will be observed that the conductors 5 are skewed, that is, they do not extend straight axially across the rotor, but are arranged so that they are actually slanted with respect to the axis of rotation. Conductors 5 are arranged parallel to each other so that each one of them has a leading edge, as shown at 8, which is actually positioned in advance of the remainder of the conductor with respect to the direction of rotation as shown by arrow 9. The direction of rotation may be determined in a well-known manner by the shape of stator 1 and the arrangement of winding 2 thereon, and will not be further discussed herein. Rotor 3 includes a centrally positioned shaft 10 which is rotatably mounted by suitable means such as bearings 11 so that the rotor is mounted rotatably with respect both to the bearings 11 and to the stator 1. Bearing support at each end of the rotor, as shown, precludes the variations in air gap 4 which tend to occur in unit bearing constructions, and thus are considered more desirable; however, the inventive concept lies in the constructions which will be explained below, and is not limited to the illustrated bearing arrangement.

As explained before, the skewed conductors 5, while necessary, tend to cause some undesirable results with respect to the third and fifth harmonics and with respect to increased stator losses. These undesirable results are directly attributable to the concentration of flux at the leading end 8 of the conductors. In order to decrease this flux concentration to a value consonant with that across the remainder of the axial length of the motor, air gap 4 is lengthened radially as shown at 12 for a predetermined axial length of the motor at leading end 8. In the embodiment of Figure 1, this has been achieved by providing rotor 3 with a tapered surface 13 at the one end so as to effect a gradually increasing air gap portion 12. This gradual increase of the air gap offsets, in effect, the tendency of the net M. M. F. to increase and thus resists the tendency for saturation to occur at the leading end 8. In the embodiment of Figure 1, the increased air gap 12 is shown as having a maximum radial length of approximately two air gaps, that is, one additional air gap. However, it will be understood that the amount of increase in the air gap is a matter of design which will be likely to vary with each particular motor to which the invention is applied. Also, while the axial length of the increased air gap portion 12 has been shown as slightly less than one-third in the embodiment of Figure 1, it will be apparent that this also is purely a matter of design which will vary with each motor to which the invention is applied. Normally, the values will vary from one-half to one and a half additional air gaps in radial length, and from 10 to 50 percent of the axial length. However, it should be borne in mind that these values are representative and are intended only as a guide to design rather than as precise limitations upon the scope of the invention.

Referring now to Figure 2 of the drawing, there is shown a second embodiment of the invention, with like numerals being used to indicate like parts. It will have been understood from the previous discussion that the important feature of the invention lies in the increase in width of the air gap at one end of the motor. In the embodiment of Figure 1, this was achieved by tapering rotor 3 as shown at 13. In the embodiment of Figure 2, the increased air gap 14 is achieved by recessing stator 1, as shown at 15. Thus, it will be seen that the increased gap may be obtained by removing part of either the rotor or the stator, with the operative effect being substantially the same and only the cost of manufacture being the consideration to determine selection. The two embodiments show that the invention is not limited to any one particular shape for the increased air gap portion and that it may be tapered as shown in Figure 1, substantially square as shown in Figure 2 or any other desired shape convenient to manufacture.

While the invention has been explained by describing particular embodiments thereof, it will be apparent that improvements and modifications may be made without departing from the scope of the invention as defined in the appended claims.

What I claim as new and desire to secure by Letters Patent of the United States is:

1. An electric induction-type motor comprising concentrically arranged rotor and stator members defining an annular air gap, said rotor member being mounted in rotatable relation to said stator member, said stator member being arranged to cause rotation of said rotor member in a single predetermined direction, said rotor member having a squirrel cage winding including a plurality of skewed conductors, said air gap having greater radial length for a predetermined axial length at the leading end of said conductors.

2. An electric induction-type motor comprising concentrically arranged rotor and stator members defining an annular air gap, said rotor member being mounted in rotatable relation to said stator member, said stator member being arranged to cause rotation of said rotor member in a single predetermined direction, said rotor member having a squirrel cage winding including a plurality of skewed conductors, one of said stator and rotor members being tapered for a predetermined axial length at the leading end of said conductors to cause said air gap to have a maximum radial length at the end of said rotor member.

3. An electric induction-type motor comprising concentrically arranged rotor and stator members defining an annular air gap, said rotor member being mounted in rotatable relation to said stator member, said stator member being arranged to cause rotation of said rotor member in a single predetermined direction, said rotor member having a squirrel cage winding including a plurality of skewed conductors, said rotor being tapered for a predetermined axial length at the leading end of said conductors thereby to provide an air gap having a maximum radial length at the end of said rotor member.

4. An electric induction-type motor comprising concentrically arranged rotor and stator members defining an annular air gap, said rotor member being mounted in rotatable relation to said stator member, said stator member being arranged to cause rotation of said rotor member in a single predetermined direction, said rotor member having a squirrel cage winding including a plurality of skewed conductors, one of said rotor and stator members being recessed for a predetermined axial length at the leading end of said conductors thereby to provide said air gap with greater radial length for said predetermined axial length.

5. An electric induction-type motor comprising concentrically arranged rotor and stator members defining an annular air gap, said rotor member being mounted in rotatable relation to said stator member, said stator member being arranged to cause rotation of said rotor member in a single predetermined direction, said rotor member having a squirrel cage winding including a plurality of skewed conductors, said stator member being recessed for a predetermined axial length at the leading end of said conductors thereby to provide said air gap with a greater radial length for said predetermined axial length.

No references cited.